(12) United States Patent
Våland

(10) Patent No.: US 8,013,782 B2
(45) Date of Patent: Sep. 6, 2011

(54) METHOD, USE OF SAID METHOD AND ARRANGEMENTS IN AN ELECTRONIC SUPPORT MEASURES SYSTEM

(75) Inventor: Per Atle Våland, Oslo (NO)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 296 days.

(21) Appl. No.: 12/306,789

(22) PCT Filed: Jun. 30, 2006

(86) PCT No.: PCT/NO2006/000252
§ 371 (c)(1),
(2), (4) Date: Dec. 29, 2008

(87) PCT Pub. No.: WO2008/002144
PCT Pub. Date: Jan. 3, 2008

(65) Prior Publication Data
US 2009/0195439 A1 Aug. 6, 2009

(51) Int. Cl.
G01S 7/02 (2006.01)

(52) U.S. Cl. .......... 342/159; 342/13
(58) Field of Classification Search .......... 342/159
See application file for complete search history.

(56) References Cited

U.S. PATENT DOCUMENTS

| | | | |
|---|---|---|---|
| 4,996,647 A | 2/1991 | Gasser et al. | |
| 6,043,770 A * | 3/2000 | Garcia et al. | 342/13 |
| 6,313,781 B1 | 11/2001 | Lee | |
| 6,914,949 B2 * | 7/2005 | Richards et al. | 375/346 |
| 7,397,415 B1 * | 7/2008 | Wang et al. | 342/13 |
| 7,411,539 B2 * | 8/2008 | Valand | 342/13 |

* cited by examiner

Primary Examiner — Thomas H. Tarcza
Assistant Examiner — Matthew M Barker

(57) ABSTRACT

A method and arrangement for processing signals emitted by a plurality of apparent emitters that is detected by an Electronic Measures System/Direction Finder unit ($ESM_1$). The $ESM_1$ unit is adapted to identify a real emitter and at least one false emitter among said apparent emitters, based on the variance of emitter characterizing parameters for each apparent emitter. When false and real emitters have been identified, this information may be used to suppress clutter from false emitters, and/or to determine the position of the real emitter using observations from only one ESM/DF unit.

14 Claims, 4 Drawing Sheets

METHOD, USE OF SAID METHOD AND ARRANGEMENTS IN AN ELECTRONIC SUPPORT MEASURES SYSTEM

TECHNICAL FIELD

The present invention relates to the use of Electronic Support Measures. This is systems used to observe radio emitters, such as radar devices, in order to detect the presence of e.g. ships and aeroplanes.

BACKGROUND

Electronic Support Measures/Direction Finder sensors receives signal from emitters, creates emitter description and determine bearing to emitters. An example of such a receiver is shown in FIG. 1.

The illustrated system includes a number of antennas 12 a-c, each with an individual receiver channel 13 a-c. In the processing unit 14, the relationships between the signals received on the antennas are used to find the direction to the emitter source 11. The "signature" of the signals from an emitter 11 may be used to identify the emitter.

In order to identify an emitter, the received signals is made subject of a rather complicated processing involving the following steps:
Pulse processing, determination of (at least):
  Carrier frequency (RF)
  Pulse Width (PW)
  Pulse Power (P)
  Time Of Arrival (TOA)
  Direction Of Arrival (DOA).
De-interleaving, (sorting of pulses by emitter) by using one or more of the calculated pulse parameters.
  The result of the de-interleaving process is a number of pulse trains, one per apparent emitter.
Emitter Processing, determination of improved emitter describing parameters; this is mainly an improved pulse processing process using information gained in the de-interleaving process:
  Improved pulse parameters and statistics: RF, P, DOA
  PRI (mean, stagger pattern, jitter pattern) by means of TOA
  Emitter antenna parameters (dwell time, and scan time, rotating or oscillating) by means of P and TOA.

Processing of signals in ESM/DF systems are described in further detail in international patent application PCT/NO2004/000412, also owned by the present applicant.

The type of sensors described above is well known. When two or more sensors observe the same emitter, it is possible to determine the position of the emitter. With only one emitter, though, only bearing determination has traditionally been possible.

Current solutions for determining emitter position involve two or more sensors which need to communicate in order to create a cross-bearing or similar. In some operative scenarios involving mobile sensors, only one sensor is observing the emitter or radio-communication restrictions limits the ability to communicate with other sensors. Thus, with traditional methods, only bearing to the emitter is possible.

If the range, i.e. the distance to the emitter, could be determined in addition to the bearing, the position of the emitter would be known. A well known method is to use knowledge of the emitter to estimate range from received power:

$$S = P_t G_t \frac{A_r}{4\pi R^2} \Leftrightarrow R = \sqrt{\frac{P_t G_t A_r}{4\pi S}}$$

Where S is received signal strength, $A_r$ is the antenna aperture, R is range. The estimate requires good knowledge of the emitter output power and antenna gain ($P_t G_t$) which must be known upfront and stored in an emitter database and also a good calibration of the ESM receiver. A minor variation of 3 dB will result in an error in the range estimate 30%, thus the accuracy of this method is usually limited. Thus, the accuracy is low at best and the method requires very good knowledge of the emitter in question.

In addition we have the effect of reflexes, which is a well known problem. ESM/DF sensors in a coastal scenario will often receive reflexes from surrounding steep cliffs, as illustrated in FIG. 2. Here, an emitter 21 is emitting signals that are scattered in several scattering points 26, 27, 28, 29 along a coastline 25 with steep cliffs. This effect may produce a multitude of apparent emitters even if only one real emitter is present. The extra emitters arising from reflected signals are called false emitters in the following description.

SUMMARY

The present invention provides a method and arrangement for identifying false emitters that may be present among a plurality of apparent emitters that is observed by an Electronic Measures System/Direction Finder unit.

This information may be used to remove the signals from the false emitters, thus avoiding unnecessary clutter from being displayed.

Another use of this information is for determining the position of an emitter using only one ESM/DF unit.

The scope of the invention is defined in the appended claims.

In particular the invention relates to a method and arrangement for identifying false emitters that may be present among a plurality of apparent emitters that is observed by an Electronic Measures System/Direction Finder unit. Said unit is adapted to identify a real emitter and at least one false emitter among said apparent emitters, said false emitter corresponding to a scattered signal from said real emitter. Further to determine a first bearing to said real emitter, determine a second bearing to said at least one false emitter, and determine the position of a scattering point for the signal creating said false emitter along the second bearing using a terrain model. Then, a third bearing of the signal from the real emitter to the scattering point is determined. The position of the scattering point, and said first and third bearings are used to determine the position of said real emitter.

The invention also relates to a use of said method for removing false emitters in a screen display of a radar device.

The inventive method may also be used for determining a position of an emitter.

BRIEF DESCRIPTION OF THE DRAWINGS

The invention will be described in detail in the following paragraphs, and in reference to the appended drawings, in which.

DETAILED DESCRIPTION

Figure 1:
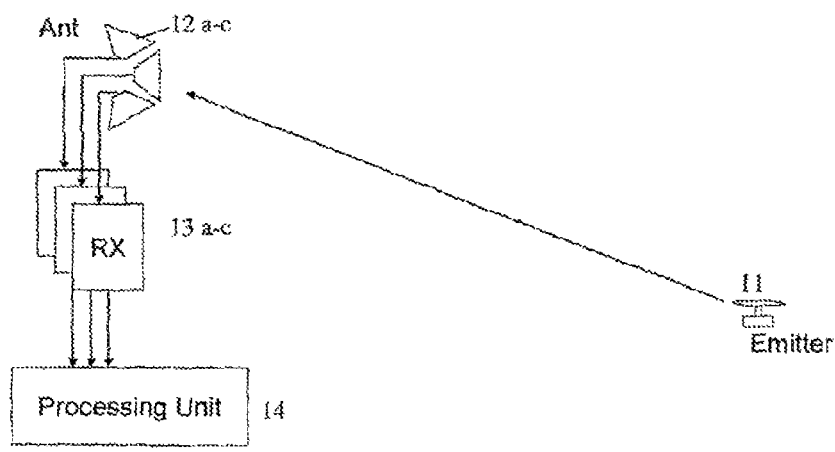
FIG. 1 is a schematic overview of an ESM/DF system.
Figure 2:
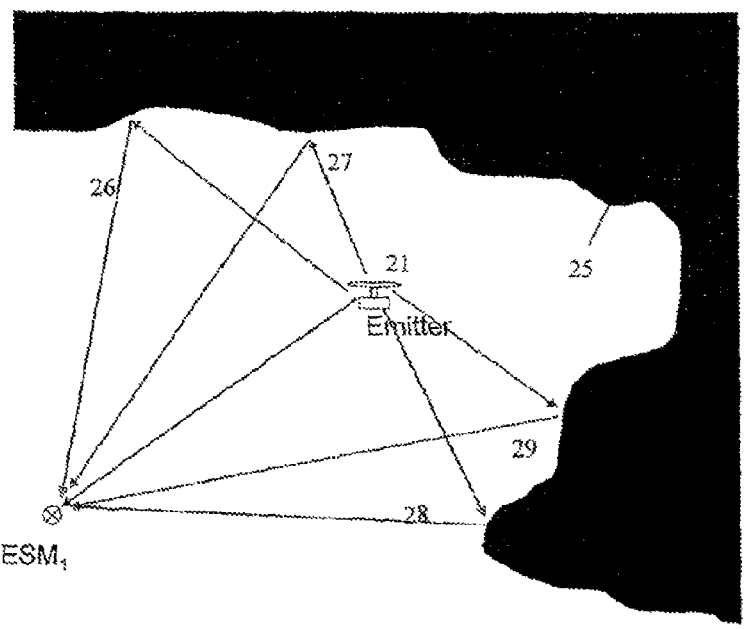
FIG. 2 illustrates the problem with reflections.

When the signals from an ESM/DF system has been processed as discussed earlier in connection with FIG. 1, there will appear a number of pulse trains, one for each real emitter present, plus a number of false emitters. Each real emitter will produce one false emitter per significant reflector that is scanned by the emitter.

The present invention includes an initial step, as each false emitter is identified. This information is used to find the position of the real emitter and/or to remove the clutter produced by the false emitters from the display screen.

Determination of Real vs "False" Emitter

For each apparent emitter, the ESM receiver has created an emitter description word that at least contains the following information (for all parameters, mean and variance are calculated):
DOA
RF
PW
P
PRI including stagger and jitter patterns
Emitter antenna scan time (rotation time or oscillation period)
Emitter antenna dwell time (time for antenna beam to "paint" one beam width)
Emitter antenna scan phase (time of antenna pointing North)
NB: ambiguous, since rotation direction is unknown The mean value $\bar{x}$ of a parameter x is given as:

$$\bar{x} = \frac{1}{N} \sum_{i=1}^{N} x_i$$

The variance of x is:

$$\mathrm{var}(x) = \frac{1}{N-1} \sum_{i=1}^{N} (x_i - \bar{x})^2$$

i being the pulse number.

By comparing parameters from each apparent emitter in the list with those of the other apparent emitters, the apparent emitters may be grouped so that all apparent emitters arising from the same real emitter are grouped together. The comparison should take into account all parameters except DOA and scan Phase and should adapt to the variance of each parameter.

When reflected off an extended scatterer, the received pulses will be modulated. Thus, the pulse measurements will have increased variance measured over the pulse train. The following characteristics will apply to the reflected pulse train from the "false" emitters when compared to the real emitter:
DOA: different mean, increased variance
RF: increased variance
PW: increased variance and usually increased mean
P: usually lower mean, increased variance
PRI and PRI pattern: equal
Emitter antenna scan time: equal mean
Emitter antenna dwell time: usually increased mean, increased variance
Emitter antenna scan phase: different The real emitter, that is the apparent emitter with the correct DOA, will be the apparent emitter with the highest quality (lowest variance in the emitter parameters).

This is also the criteria used for grouping the apparent emitters.

Figure 5:
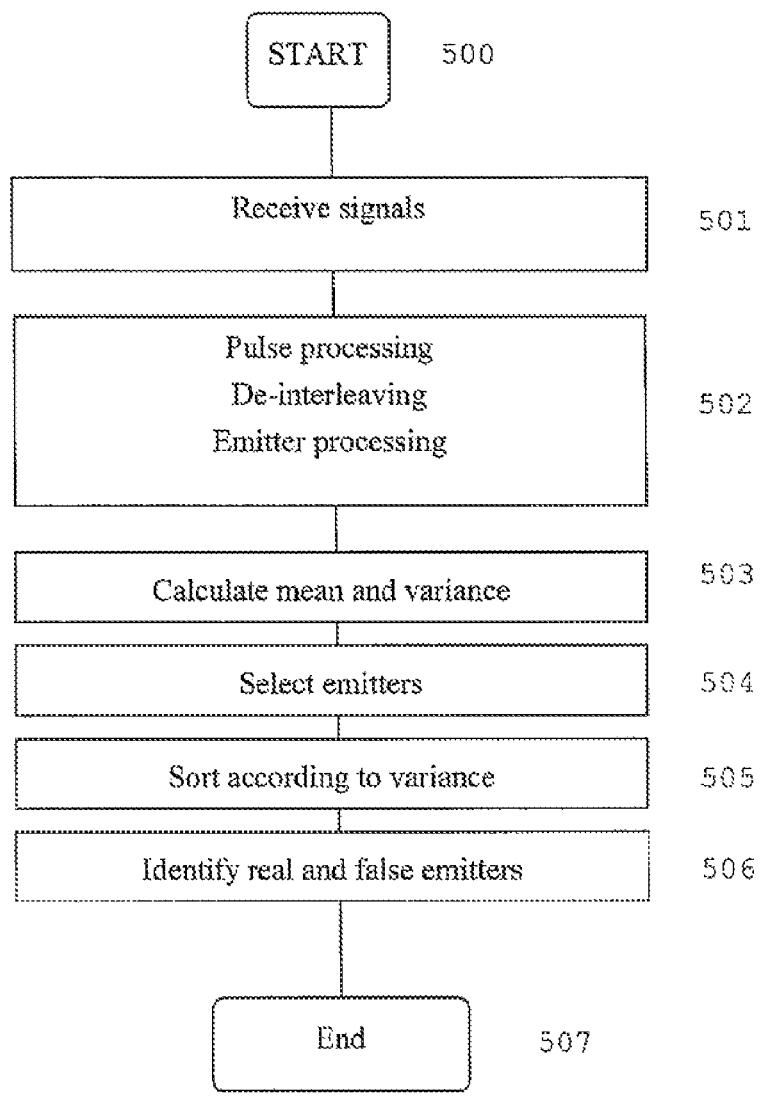
FIG. 5 is a flow diagram showing the method steps of one aspect of the invention.

The procedure outlined above is illustrated in FIG. 5 as a flow diagram showing each individual step performed when identifying real and false emitters. The method is illustrated as a linear procedure from a start point 500 to an end point 507. However, when the nature of the emitters in a scenario has been determined, the procedure will start all over again from step 500.

When started, the procedure continues to step 501 where signals are received. The signals are processed in conventional manner with pulse processing, de-interleaving and emitter processing, step 502. The emitters forming a coherent group of related subjects are selected in step 504. The emitters are sorted according to variance, step 505. This information is used to identify real and false emitters, step 506.

Position Determination with Single ESM/DF Sensor

Figure 3:
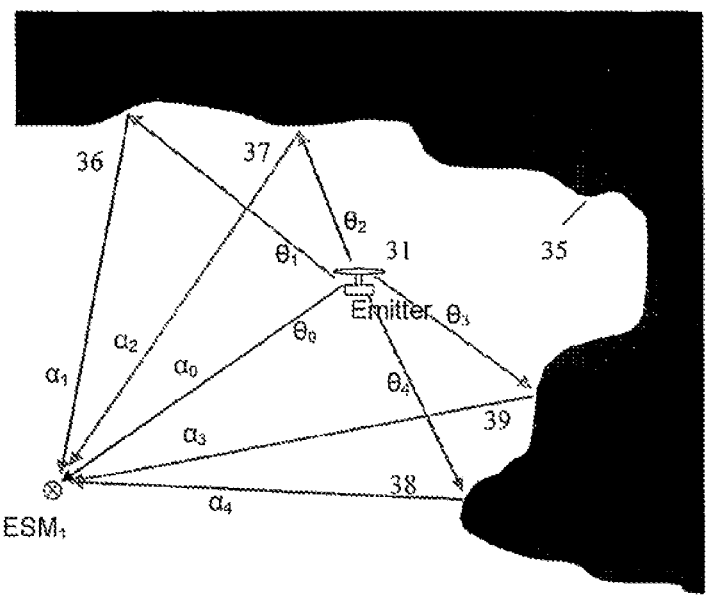
FIG. 3 illustrates how reflections are used with advantage in the present invention.

In a coastal scenario, where reflexes produce "false" emitters, the information identifying the real and false emitters may be used with advantage in an alternate method for finding the position of an real emitter, see FIG. 3:

Assume that an emitter 31 is transmitting in a coastal scenario and that reflected pulses off local terrain produce false emitters as discussed above.

Analyze the pulse trains according to the above and retain a list of false emitters with different DOA and different main lobe phase.

Calculate the bearing from the ESM sensor to each scatterer 36, 37 from the DOA for each false emitter ($\alpha_n$ in FIG. 3)

Calculate the bearing from the emitter 31 to each scatterer 36, 37 by:

$$\theta_n = \frac{t_n - t_0}{T}$$

where $t_n$ is the measured antenna scan phase of the false emitter, $t_0$ is the antenna scan phase of the real emitter and T is the emitter antenna scan period.

If the position of the emitter 31 was known, the position of the scatterer 36, 37 would easily be found by triangulation. Our problem is opposite, and the position of both the scatterers and the emitter is unknown.

In order to solve the problem, a terrain model is used, where local scattering may be estimated. In practice even a coastline polygon will suffice.

With multiple scatterers (multiple false emitters), the emitter position may be estimated as the position along the bearing line from the sensor through the emitter which gives the best correlation between scattering model and actual scatterer.

Figure 4:
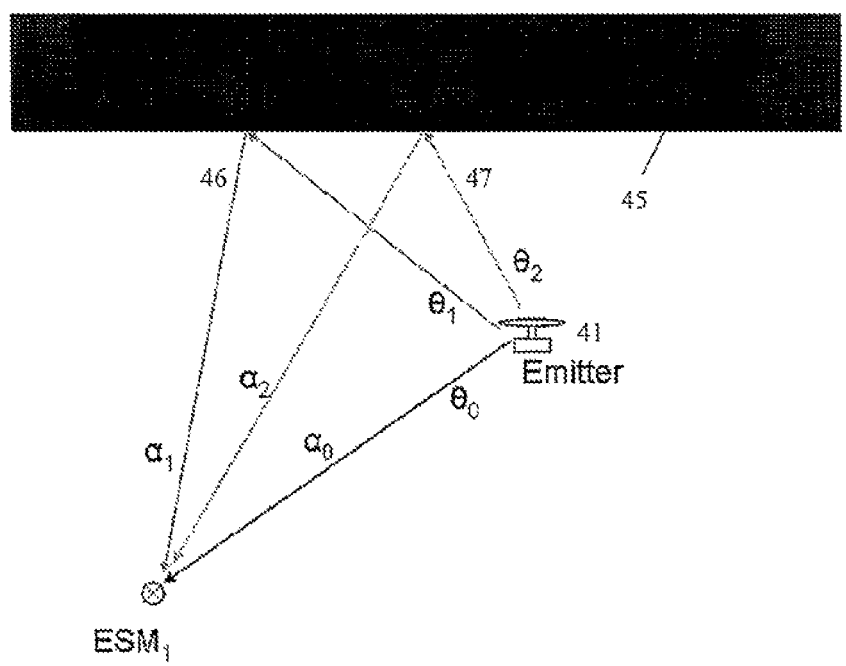
FIG. 4 illustrates a detail of the invention.

As an example, illustrated in FIG. 4, take a straight line coastline with steep cliffs:

The false emitter algorithm above has produced a set of one "real" emitter 41 and two false emitters (three apparent emitters)

The direction from the ESM/DF sensor $ESM_1$ to each apparent emitter is calculated ($\alpha_0$, $\alpha_1$, and $\alpha_2$)

The direction from the emitter 41 to each scatterer 46, 47 is known ($\theta_1$ and $\theta_2$) Note that the ambiguity in emitter antenna phase may be resolved as soon as there is any significant "false" emitter present.

Since the coastline consists of a steep cliff, the scatterers 46, 47 may be assumed to lie on the coastline 45. Thus the position of each scatterer 46, 47 may be determined from $\alpha_1$ and $\alpha_2$ and the sensor position. Thus the emitter position may be calculated from $\theta_1$ and $\theta_2$.

Note that only one scatterer would suffice.

Figure 6:
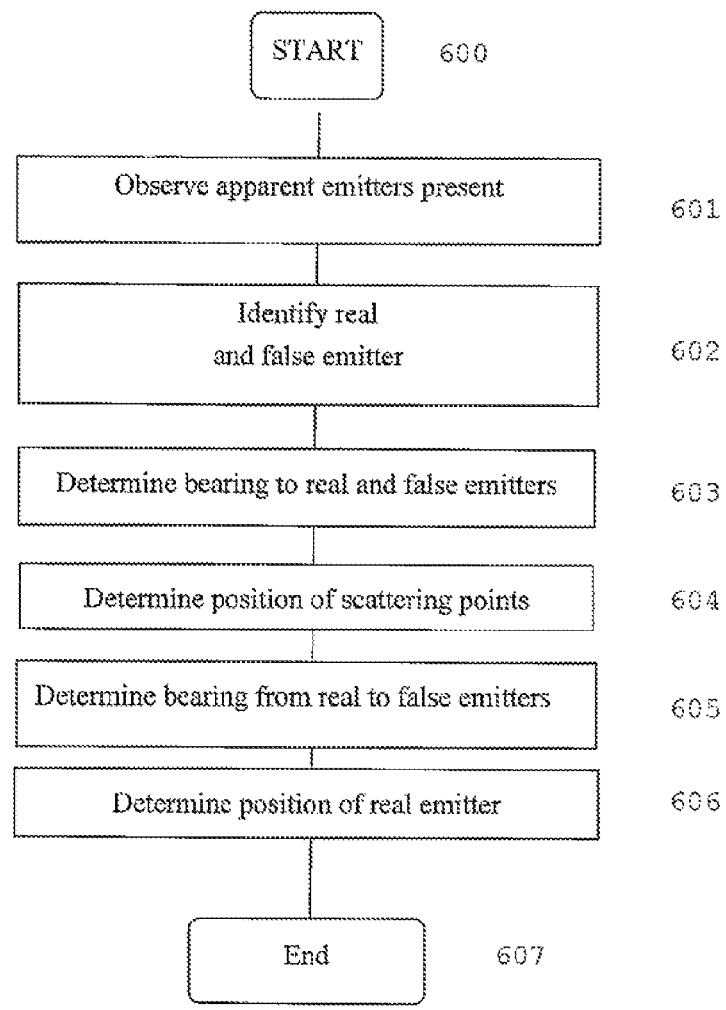
FIG. 6 is a flow diagram showing the method steps of another aspect of the invention.

This procedure for finding the position of an emitter is illustrated in FIG. 6 as a flow diagram showing each individual step performed. The method is initiated in a start point 600 proceeding to step 601 where signals are received from an ESM/DF unit. Observed emitters are classified according to the procedure illustrated in FIG. 5 in step 602. Then, the bearings to the emitters are determined, step 603, the position of scattering points are determined, step 604, and the bearings from real to false emitters determined, step 605. Lastly, the various positions and bearings are used to determine the position of the real emitter in step 606, before the procedure is ended in step 607.

The method described above may be performed in the processing unit of an ESM/DF unit, or the pulse processed, de-interleaved and emitter processed signals may be sent to a remote processing unit, e.g. a server, for processing. The terrain model may be stored in a database, either locally or in a remote processing unit.

The advantages of this invention are twofold: A reduction of clutter due to false emitters, which is a large improvement in itself, and the ability to estimate emitter position by means of only one ESM/DF sensor.

While the invention has been described in a setting involving ESM/DF units observing radar devices, i.e. operating in the upper electromagnetic radio spectrum, it may also be used in other settings as well. One such alternative is for determining the position of mobile telephones, in particular when observing their radio signals from a base station. The invention may also be used in systems determining position of acoustic emitters, on signals received through air or water (sonar). The invention may also be applicable in the seismic industry, in particular for removing clutter from false reflections.

The invention claimed is:

1. A computer-implemented method for identifying real and false emitters observed by an Electronic Measures System, wherein said real and false emitters are identified by pulse processing the received signals, de-interleaving the signals, emitter processing the signals determining emitter characterizing parameters for each apparent emitter, the method comprising the steps of:
   determining, using a processing unit, the variance of each emitter characterizing parameter;
   selecting, using the processing unit, those apparent emitters originating from the real emitter into a group;
   sorting, using the processing unit, the apparent emitters according to the variance of the emitter characterizing parameters; and
   identifying, using the processing unit, the apparent emitter with the least variance values as the real emitter, and the other apparent emitters in the group as false emitters.

2. The method of claim 1, wherein the pulse processing includes determination of Carrier Frequency, Pulse Width, Pulse Power, Time Of Arrival, Direction Of Arrival.

3. The method of claim 1, wherein the de-interleaving includes sorting by means of Direction Of Arrival.

4. The method of claim 1, wherein the de-interleaving is based on Time of Arrival and includes the additional step of splitting received pulses according to reception angle.

5. The method of claim 1, wherein the emitter processing includes determination of Direction of Arrival, Carrier Frequency, Pulse Width, Pulse Power, Pulse Repetition Interval, emitter antenna scan time, emitter antenna dwell time, emitter antenna scan phase.

6. The method of claim 1, wherein the selection is performed by comparing Carrier Frequency, Pulse Width, Pulse Power, Pulse Repetition Interval, emitter antenna scan time, and emitter antenna dwell time for each apparent emitter.

7. The method of claim 1 for use in removing false emitters in a screen display of a radar device.

8. The method of claim 1 for use in for determining a position of an emitter.

9. The method of claim 8, further comprising the steps of:
   receiving signals, using the processing unit, from a plurality of apparent emitters in an Electronic Measures System/Direction Finder unit ($ESM_1$);
   identifying, using the processing unit, a real emitter and at least one false emitter among said apparent emitters, said false emitter corresponding to a scattered signal from said real emitter;
   determining, using the processing unit, a first bearing to said real emitter;
   determining, using the processing unit, a second bearing to said at least one false emitter;
   determining, using the processing unit, the position of a scattering point for the signal creating said false emitter along the second bearing;
   using a terrain model, determining, using the processing unit, a third bearing of the signal from the real emitter to the scattering point;
   determining, using the processing unit, the position of said real emitter from the position of the scattering point and said first and third bearings.

10. The method of claim 9, wherein the third bearing is determined from the relationship:

$$\theta_n = \frac{t_n - t_0}{T},$$

where $t_n$ is a measured antenna scan phase of the false emitter, $t_0$ is an antenna scan phase of the real emitter and T is an emitter antenna scan period.

11. The method of claim 9, wherein the terrain model is a coastline map and the scattering point is determined as the intersection between the second bearing and the coastline.

12. The method of claim 9, wherein the terrain model is a coastline polygon.

13. An apparatus for identifying real and false emitters observed by an Electronic Measures System, the Electronic Measures System (ESMi), comprising:
   a plurality of receiving antennas each with an individual receiving channel; and
   a processing unit wherein the processing unit is configured to pulse process, de-interleave and emitter process signals determining emitter characterizing parameters for each apparent emitter;
   said processing unit further including means configured to determine the variance of each emitter characterizing parameter, means configured to select those apparent emitters originating from the real emitter into a group, means configured to sort the apparent emitters according to the variance of the emitter characterizing parameters, and means configured to identify the apparent emitter with the least variance values as the real emitter, and the other apparent emitters in the group as false emitters.

14. The apparatus of claim 13, wherein said means are implemented within the processing unit.

* * * * *

UNITED STATES PATENT AND TRADEMARK OFFICE
CERTIFICATE OF CORRECTION

| | | |
|---|---|---|
| PATENT NO. | : 8,013,782 B2 | Page 1 of 1 |
| APPLICATION NO. | : 12/306789 | |
| DATED | : September 6, 2011 | |
| INVENTOR(S) | : Våland | |

It is certified that error appears in the above-identified patent and that said Letters Patent is hereby corrected as shown below:

In Column 2, Line 30, delete "Measures" and insert -- Support Measures --, therefor.

In Column 2, Line 41, delete "Measures" and insert -- Support Measures --, therefor.

In Column 6, Line 20, in Claim 9, delete "Electronic Measures" and insert -- Electronic Support Measures --, therefor.

In Column 6, Line 55, in Claim 13, delete "Electronic Measures" and insert -- Electronic Support Measures --, therefor.

In Column 6, Line 56, in Claim 13, delete "Measures" and insert -- Support Measures --, therefor.

In Column 6, Line 56, in Claim 13, delete "(ESMi)," and insert -- ($ESM_1$), --, therefor.

Signed and Sealed this
Twenty-eighth Day of February, 2012

David J. Kappos
*Director of the United States Patent and Trademark Office*